(12) United States Patent
Deb

(10) Patent No.: US 7,768,520 B2
(45) Date of Patent: Aug. 3, 2010

(54) HIERARCHICAL TILING OF DATA FOR EFFICIENT DATA ACCESS IN HIGH PERFORMANCE VIDEO APPLICATIONS

(75) Inventor: Sutirtha Deb, Bangalore (IN)

(73) Assignee: Ittiam Systems (P) Ltd., Bangalore, Karnataka (IN)

( * ) Notice: Subject to any disclaimer, the term of this patent is extended or adjusted under 35 U.S.C. 154(b) by 542 days.

(21) Appl. No.: 11/381,361

(22) Filed: May 3, 2006

(65) Prior Publication Data

US 2007/0257926 A1 Nov. 8, 2007

(51) Int. Cl.
*G06T 1/60* (2006.01)
(52) U.S. Cl. ........................ 345/530; 345/544; 348/718
(58) Field of Classification Search ................ 345/544; 348/718
See application file for complete search history.

(56) References Cited

U.S. PATENT DOCUMENTS

| | | | | |
|---|---|---|---|---|
| 5,471,248 A | * | 11/1995 | Bhargava et al. | 375/240.24 |
| 5,559,953 A | * | 9/1996 | Seiler et al. | 345/543 |
| 5,581,310 A | * | 12/1996 | Vinekar et al. | 348/718 |
| 5,675,387 A | * | 10/1997 | Hoogenboom et al. | 375/240.15 |
| 5,717,461 A | * | 2/1998 | Hoogenboom | 375/240.25 |
| 5,900,857 A | * | 5/1999 | Kuwata et al. | 345/100 |
| 5,900,865 A | * | 5/1999 | Howe | 345/572 |
| 5,912,676 A | * | 6/1999 | Malladi et al. | 345/531 |
| 5,990,912 A | * | 11/1999 | Swanson | 345/568 |
| 6,005,624 A | * | 12/1999 | Vainsencher | 375/240.14 |
| 6,064,407 A | * | 5/2000 | Rogers | 345/568 |
| 6,088,047 A | * | 7/2000 | Bose et al. | 345/547 |
| 6,097,832 A | * | 8/2000 | Guillotel et al. | 382/107 |
| 6,104,416 A | * | 8/2000 | McGuinness | 345/544 |
| 6,611,272 B1 | * | 8/2003 | Hussain et al. | 345/531 |
| 6,614,442 B1 | * | 9/2003 | Ouyang et al. | 345/545 |
| 6,667,745 B1 | * | 12/2003 | Hussain | 345/545 |
| 6,972,768 B2 | * | 12/2005 | Hussain et al. | 345/531 |
| 6,989,837 B2 | * | 1/2006 | Gu et al. | 345/558 |
| 7,042,460 B2 | * | 5/2006 | Hussain et al. | 345/545 |
| 2004/0100472 A1 | * | 5/2004 | Linzer et al. | 345/536 |
| 2004/0155883 A1 | * | 8/2004 | Ju et al. | 345/544 |
| 2004/0252127 A1 | * | 12/2004 | Linzer et al. | 345/537 |

\* cited by examiner

*Primary Examiner*—M Good Johnson
(74) *Attorney, Agent, or Firm*—Prakash Nama; Global IP Services, PLLC

(57) ABSTRACT

In a video application, a method and system provide different sizes of data-fetch where the data transfer rate between a decoder and an external memory (e.g., DDR memory) is extremely high, as for example in HDTV systems. The invention in one form divides a reference frame into different tiles where each tile is hierarchically divided into smaller tiles to a level where the minimum tile size is the same as the fixed burst size of the DDR memory. The method also provides for arranging the biggest tiles into different banks and pages so that even if the block to be fetched falls across tile boundaries, the latency penalty in the tile transition will be minimized. The invention provides advantages also for progressive and interlaced data fetch.

16 Claims, 14 Drawing Sheets

US 7,768,520 B2

HIERARCHICAL TILING OF DATA FOR EFFICIENT DATA ACCESS IN HIGH PERFORMANCE VIDEO APPLICATIONS

FIELD OF THE INVENTION

This invention generally relates to the field of video decoding, and more specifically to video decoding where the data transfer rate between the decoder and the external memory is extremely high, as in HDTV (High Definition TV) for example.

BACKGROUND OF THE INVENTION

HDTV promises a very impressive quality of picture compared to the contemporary standard definition digital TV by substantially increasing the picture resolution. The picture resolution for HDTV application can be as high as 2K×1K, demanding a very high rate of compression of the video data. The standards like H.264 or WMV9 are able to provide 60:1 or higher compression ratios at a particular level, making it suitable for HDTV application at the cost of increasing the complexity of the compression tools. An example of the motion estimation (ME) process in H.264, which is the major source of compression, will give an insight into the complexities involved and the corresponding consequences on the decoder side. In order to achieve very high compression, the standard allows to interpolate quarter pixel locations in the reference frame for motion estimation, and the number of reference frames can be as high as 16 for certain levels. Reference may be had to FIG. 2 in this context, showing different block sizes. The block sizes are variable and include sizes such as 16×16 (200), 16×8 (201), 8×16 (202), 8×8 (203), 8×4 (206), 4×8 (205) and 4×4 (204), because of which a 16×16 macroblock can be made of any combination of blocks. As a consequence, the decoder has to handle high complexities like more computations due to the quarter pixel interpolation, handling of multiple reference frames and above all huge data transfer with the external memory. Having reference to FIG. 3, for the quarter pixel interpolation of the luminance component, the motion compensation MC (104) needs 5 more pixels from both the directions which leads the MC to fetch a 9×9 block 301 of pixels 300 to compensate a 4×4 block 302 which means 4 times extra data for each 4×4 block. In a real time application, the huge amount of data to be fetched during a high resolution frame decoding time and its 2-D nature in the external memory demands extremely high external memory bandwidth, thereby creating a bottleneck in the design of a HDTV video decoder. Added bandwidth inefficiency results owing to fixed burst size of DDR (Double Data Rate) memory 106 (which is invariably required due to the high bandwidth requirement in HDTV applications) because of which extra data has to be fetched along with the required data. The amount of required data fetch cannot be reduced since the standard mandates that for a high compression ratio, the bandwidth requirement for MC can be reduced by packing the frame data in an efficient manner in the external memory which will reduce both extra data fetch and page or bank change latencies.

The data in the external memory can either be stored in raster scan order of the pixels, or grouping a few macroblocks and storing the pixels of each group in raster scan order in one page in the memory. If the data in the external memory is in a raster scan order of pixels, then a fetch of one M×N block may need "N" page changes which involve high latency. Even if the pixel rows are stored in different banks in a round-robin order, row precharge and activation time for different banks can't be completely hidden for small burst sizes. As the 4×4 block needs to fetch 5 times more data for interpolation (9×9 chunks), such kind of frequent row change latency will make the worst case bandwidth requirement extremely high, and the bus efficiency extremely poor.

Although Motion Compensation takes around 70% of the total bandwidth, the data required for other compression tools like in-loop filter 107 in both H.264 and WMV9 standard is also significant, whereby the data storage scheme needs to be suitable for all the requirements by different tools.

As prior art in the related field, the following publications may be referred to:

1. Tetsuro Takizawa (Multimedia Research Laboratory, NEC Corporation) and Masao Hirasawa ($1^{st}$ system LSI Division, NEC Electron Devices), "An efficient memory arbitration algorithm for a single chip MPEG2 AV decoder", IEEE Transaction on Consumer Electronics, Vol. 47, No. 3, August 2001.

2. Marco Winzkerl, Peter Pirsch (Laboratorium fur Informationstechinologie, Universitat Hannover, Germany) and Jochen Reimers (Deutsche Bundespost TELEKOM, Forschungs-und Technologiezentrum, Germany), "Architecture and memory requirements for stand-alone and hierarchical MPEG2 HDTV-decoders with synchronous DRAMs.pdf", IEEE.

3. Egbert G. T. Jaspers and Peter H. N. de, "Bandwidth reduction for video processing for consumer systems", September 2001.

U.S. Pat. No. 6,614,442, titled "Macroblock tiling format for motion compensation", issued to Ouyang, et al., tiles the luminance and chrominance components of several MBs and places them in a single page in the memory. The problem with such storage is that the tile size is fixed. A small block, say 9×9 in H.264 may have to fetch the complete tile if the DDR RAM (Random Access Memory) is configured for a larger burst or it has to fetch data in small bursts to avoid fetching of redundant data which is highly inefficient for other kind of data transfers. This tiling does not give any advantage where the block sizes are variable and does not separate top and bottom fields for an interlaced picture.

All the prior art work generally relates to tiling of data in the external memory packs set of macroblocks in a different fashion, and is only suitable for a fixed and bigger size of data fetch.

There is therefore need for an efficient data storage technique which is adaptable and which reduces the bandwidth requirement for variable block size and is suitable for various tools in the decoder which needs the external memory transactions.

SUMMARY OF THE INVENTION

Described herein are a method and system for variable size data-fetch where the data transfer rate between a decoder and an external memory is extremely high, as for example in HDTV systems. The invention in one form resides in a method in a video application using data-access from an external memory, the method being directed to data arrangement in the external memory, comprising the steps of: partitioning the data into a first set of tiles; and, further partitioning the tiles from the first set recursively into further sets of smaller tiles. In one form, the method divides a reference frame into different (hierarchical) tiles where each tile is hierarchically divided into smaller tiles to a level where the minimum tile size is based on a fixed burst size of the DDR memory. The invention also provides a method to arrange the topmost layer of tiles into a single page and distribute into different banks, so that even if the block to be fetched falls across tile boundaries, the latency penalty in the tile transition will be minimized.

The invention provides advantages for variable size transfer and equal advantages to progressive and interlaced data fetch.

One embodiment of the invention resides in a method for a high performance video application where data is handled in tiles and a DRAM/DDR (Dynamic Random Access Memory/ memory is used, the method being directed to storing and fetching data from an external memory, comprising the steps of: dividing the data into variable block sizes and, choosing a minimum tile size to be based on a fixed burst size of the DRAM/DDR memory.

A second embodiment resides in a method of data handling in a high performance video application using reference frames, tiles and a memory, comprising the steps of: dividing a reference frame into several macroblocks in raster scan order, to form a top layer of tiles; and, further dividing each of said tiles into smaller blocks in a hierarchical manner to form lower layers of tiles.

Also covered herein are articles comprising a storage medium having instructions thereon which when executed by a computing platform will result in execution of one of the methods as recited herein.

BRIEF DESCRIPTION OF THE DRAWING

A more detailed understanding of the invention may be had from the following description of embodiments, given by way of example. In the following detailed description of the embodiments, reference is made to the accompanying drawing that forms a part hereof, and in which are shown by way of illustration of specific embodiments in which the invention may be practiced. It is understood that other embodiments may be utilized and changes in configuration may be made without departing from the scope of the present invention.

In the accompanying drawing.

DETAILED DESCRIPTION OF EMBODIMENTS

A detailed description of embodiments of the invention is provided below to be understood in conjunction with the accompanying FIGs, illustrating by way of example the principles of the invention. While the invention is described in connection with such embodiments, it should be understood that the invention is not limited to any specific embodiment. On the contrary, the scope of the invention is limited only by the appended claims and their equivalents, and the invention encompasses numerous alternatives, modifications and equivalents. Only as examples, numerous specific details are set forth in the following description in order to provide a thorough understanding of the present invention.

The present invention may be practiced according to the claims without some or all of these specific details. For purposes of clarity, technical material that is known in the technical fields related to the invention has not been described in detail so that the present invention is not unnecessarily obscured.

Figure 1:
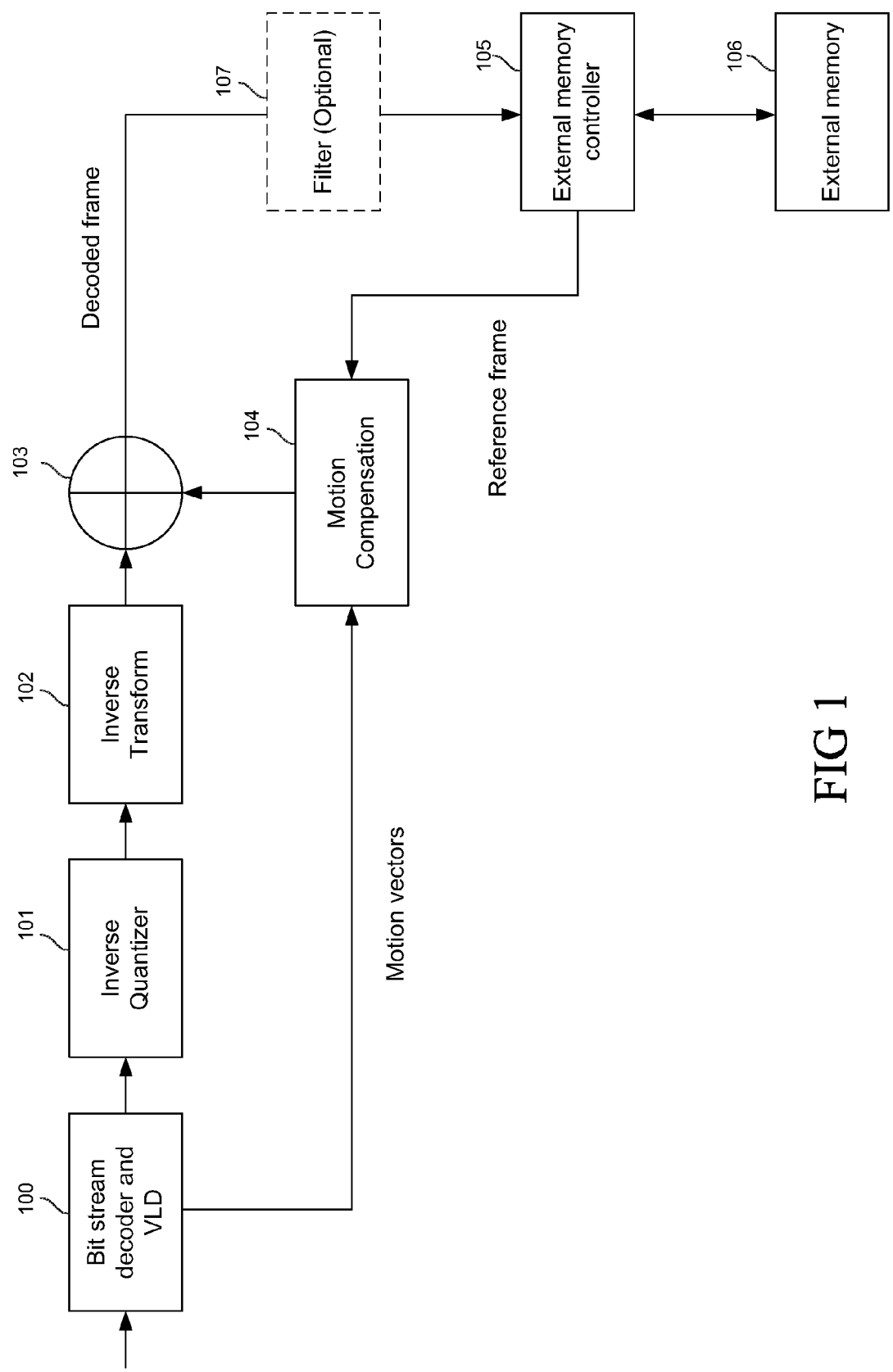
FIG. 1 shows a generic block diagram of the video decoder which includes an external memory and the external memory controller.

FIG. 1 shows a generic video decoding system. The encoded data comes into decoder 100 which decodes the syntax elements of the encoded bit stream and decodes the variable length coded coefficients. The decoder 100 sends the quantized coefficients to the inverse quantizer block 101, and the motion vectors to MC block 104. The block 101 inverse quantizes the coefficients and sends to inverse transform block 102 which does the inverse transforms to bring the coefficients from the frequency domain to the spatial domain. The MC block 104 decodes the motion vectors and fetches the reference data from the external memory through the external memory controller. The block 103 adds the differential transformed coefficients with the reference data to form the pixel values. The standards like H.264, WMV9 or MPEG4 mandate in-loop filtering of the pixels to remove the blocking artifacts. The optional filter 107 does filtering on the block boundary and store the data in the external memory for future frame reference.

Figure 2:
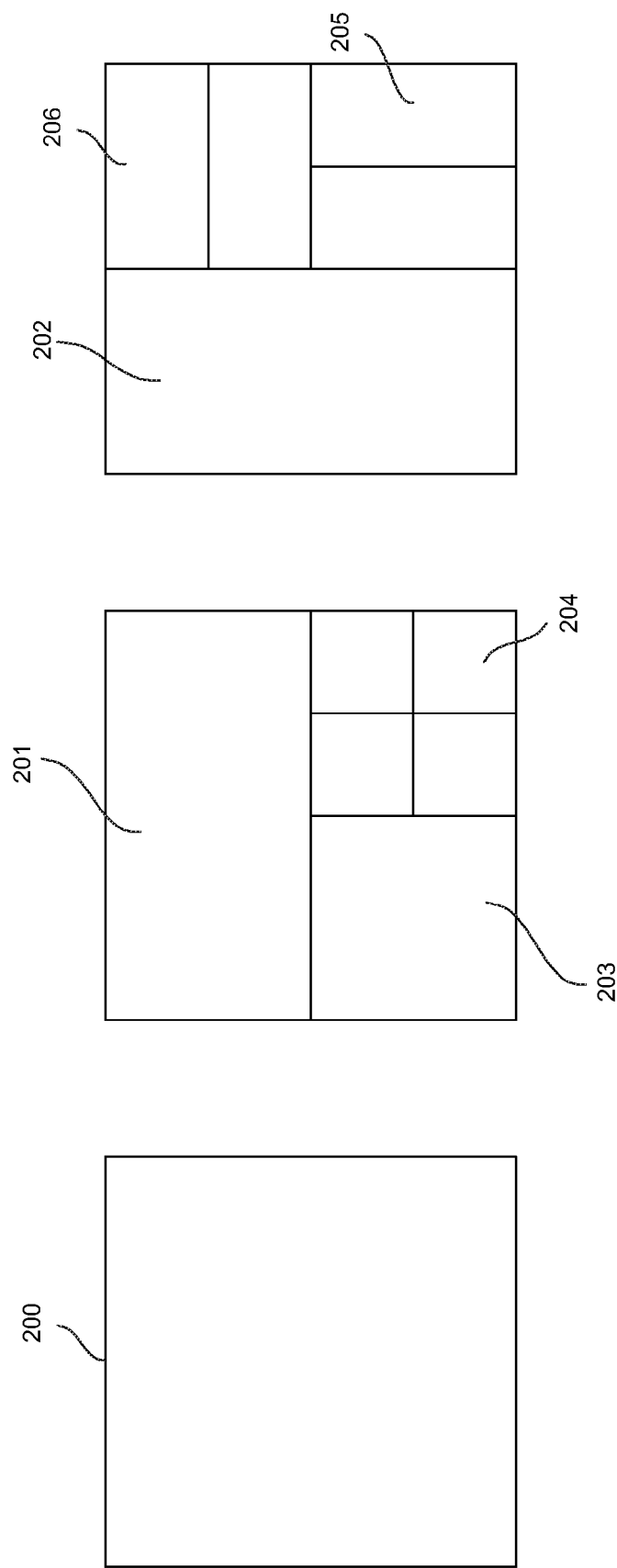
FIG. 2 shows variable block sizes in H.264, wherein the 3 macroblocks in the diagram show all the sub-block types a macroblock can have.

FIG. 2 shows the sub-block partitioning of a macroblock in H.264 which gives the opportunity to the Motion Estimator in the encoder to divide the macroblock in various ways to get a better match. On the decoder side, it means that the MC has to fetch variable sized data from the external memory which imposes one more criterion on the reference frame storage in the external memory such that the scheme should be suitable for variable blocks ranging from 4×4 (204) to 16×16 (200).

Figure 3:
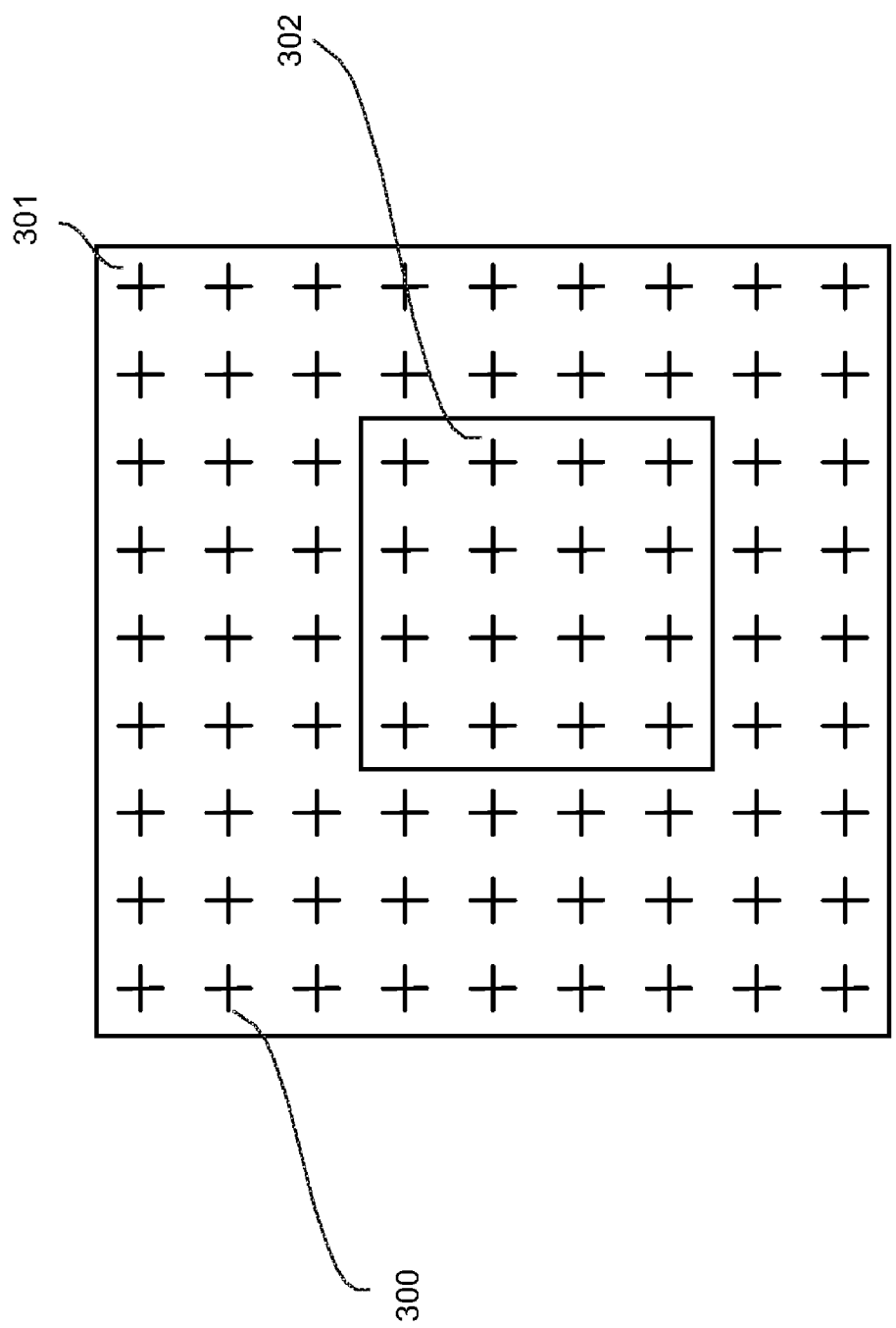
FIG. 3 illustrates the 9×9 block size that the Motion Compensation needs to fetch for a 4×4 block interpolation.

FIG. 3 illustrates a 9×9 reference data fetch for a 4×4 block in H264. The MC function needs to fetch a 9×9 block 301 of pixels 300 to compensate a 4×4 block 302 which means 4 times extra data for each 4×4 block.

Figure 4:
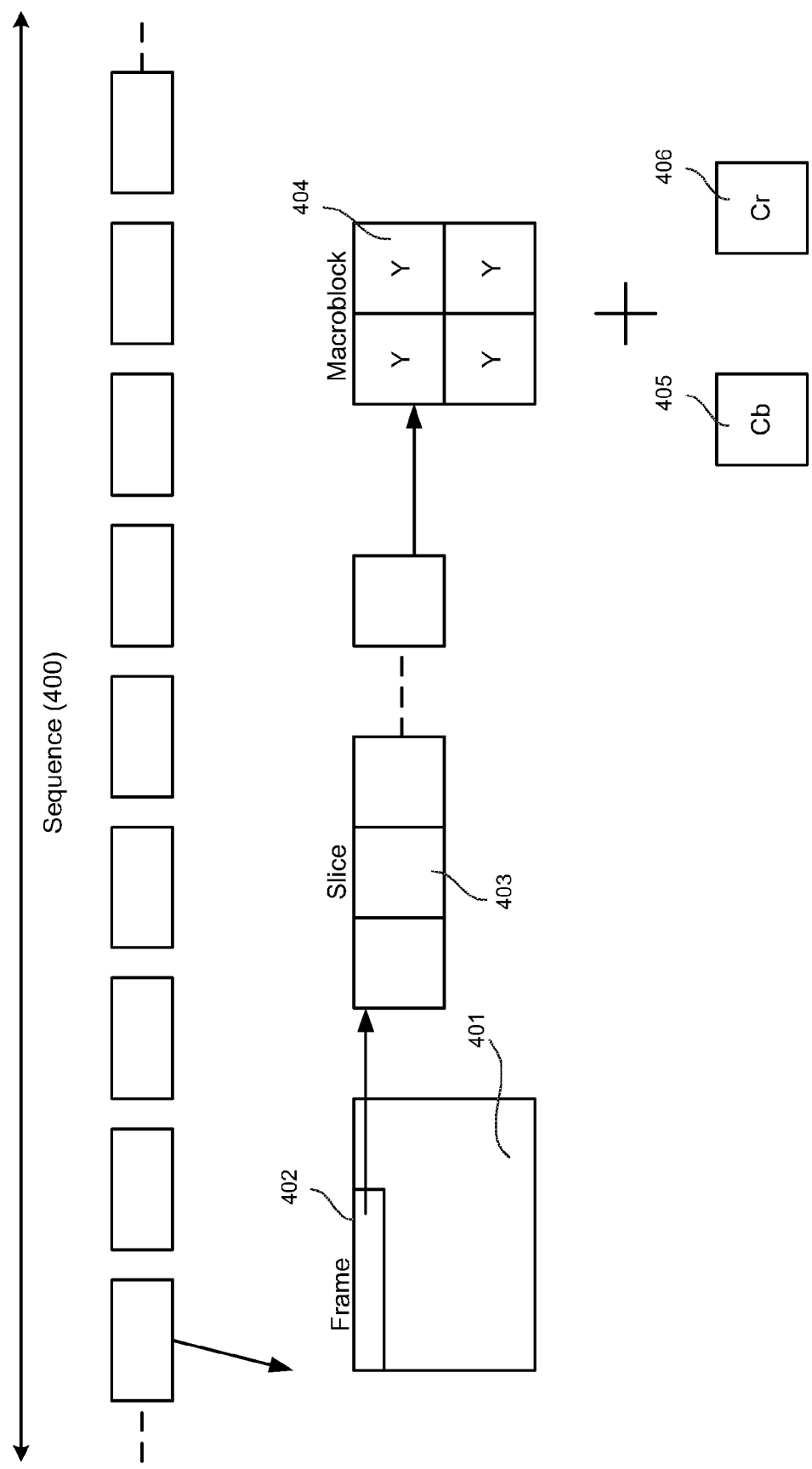
FIG. 4 illustrates a generic video decoder block diagram which implements the proposed embodiment and the external memory.

FIG. 4 shows a generic video sequence and general construction of video stream. The video sequence 400 is a sequence of video frames which are separated in time. The frames in a sequence have certain common features like the resolution, profile, level, etc. As illustrated, frame 401 is again composed of slices 402. The size and the organization of the slices could vary from standard to standard, and even their consideration is optional. Each slice 402 as shown, is divided into 16×16 macroblocks 403 which are again divided into four 8×8 luminance blocks 404, one 8×8 $C_b$ chrominance (405) and one 8×8 $C_r$ chrominance (406) block.

Figure 5:
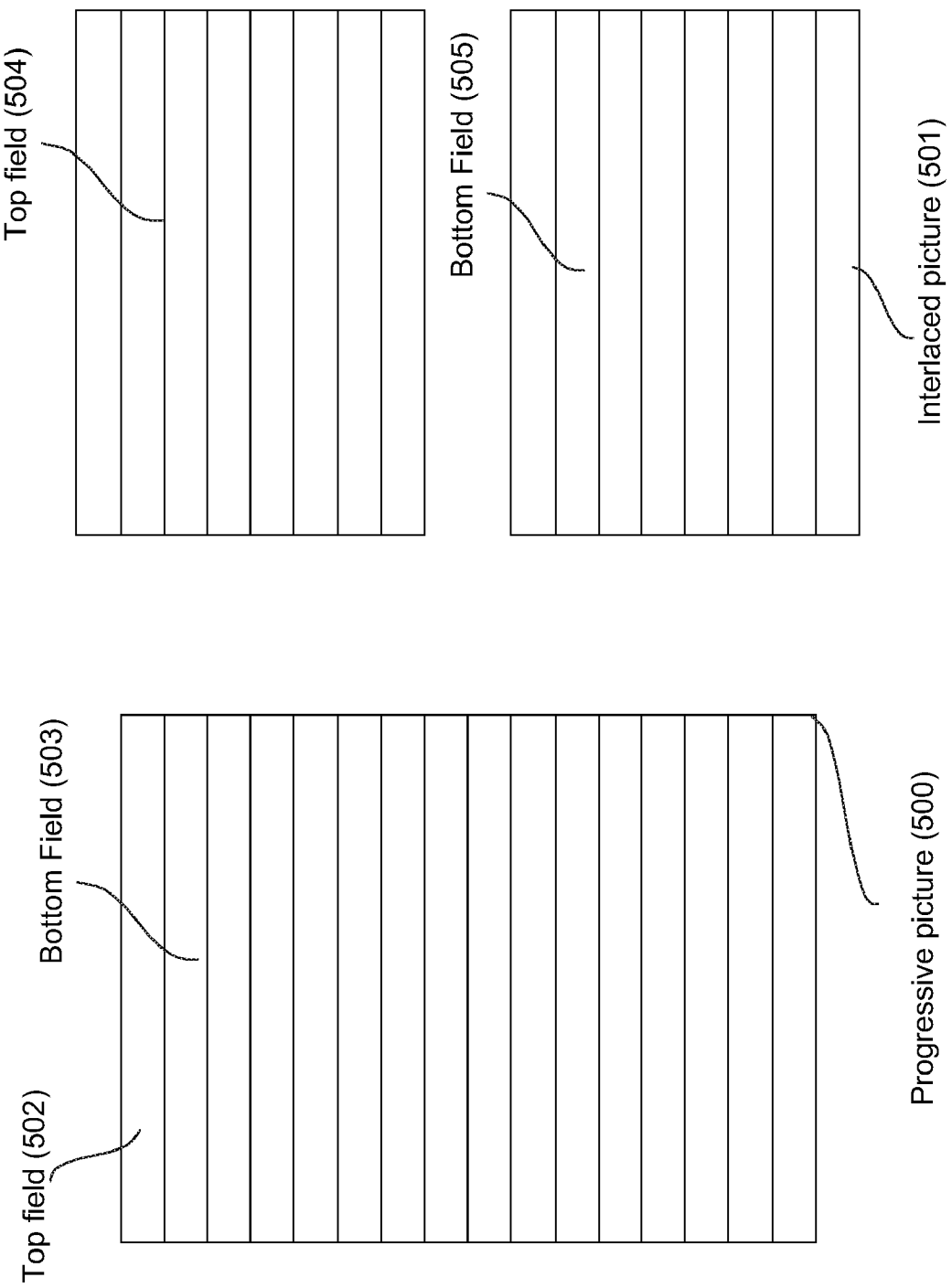
FIG. 5 shows the progressive and interlaced picture.

FIG. 5 illustrates a progressive and interlaced picture and shows how different rows of pixels can be coded in different ways. The even lines of pixels in the frame form the top field and the odd lines form the bottom field. The encoder may interleave the top field 502 and the bottom field 503 together and treat them as a single entity which is called a progressive picture 500, or separate out the top field 504 and bottom field 505 and code them separately constituting an interlaced picture 501. In a video sequence, a picture can be either interlaced or progressive and even in a picture the individual macroblocks (in WMV9) or Macroblock pairs (in H.264) can have the fields separated to form a field macroblock or combined together to form a frame macroblock.

The decoding operation happens on a macroblock basis and some of the operation differs for luminance and chrominance components. If the picture or the macroblock is frame coded, the MC or the in-loop filter has to fetch both the fields of the reference picture together and if they are field coded, they have to fetch them separately which imposes criteria on the reference frame storage in the external memory such that the scheme should get equal benefit for field as well as frame coded data fetch.

Figure 6:
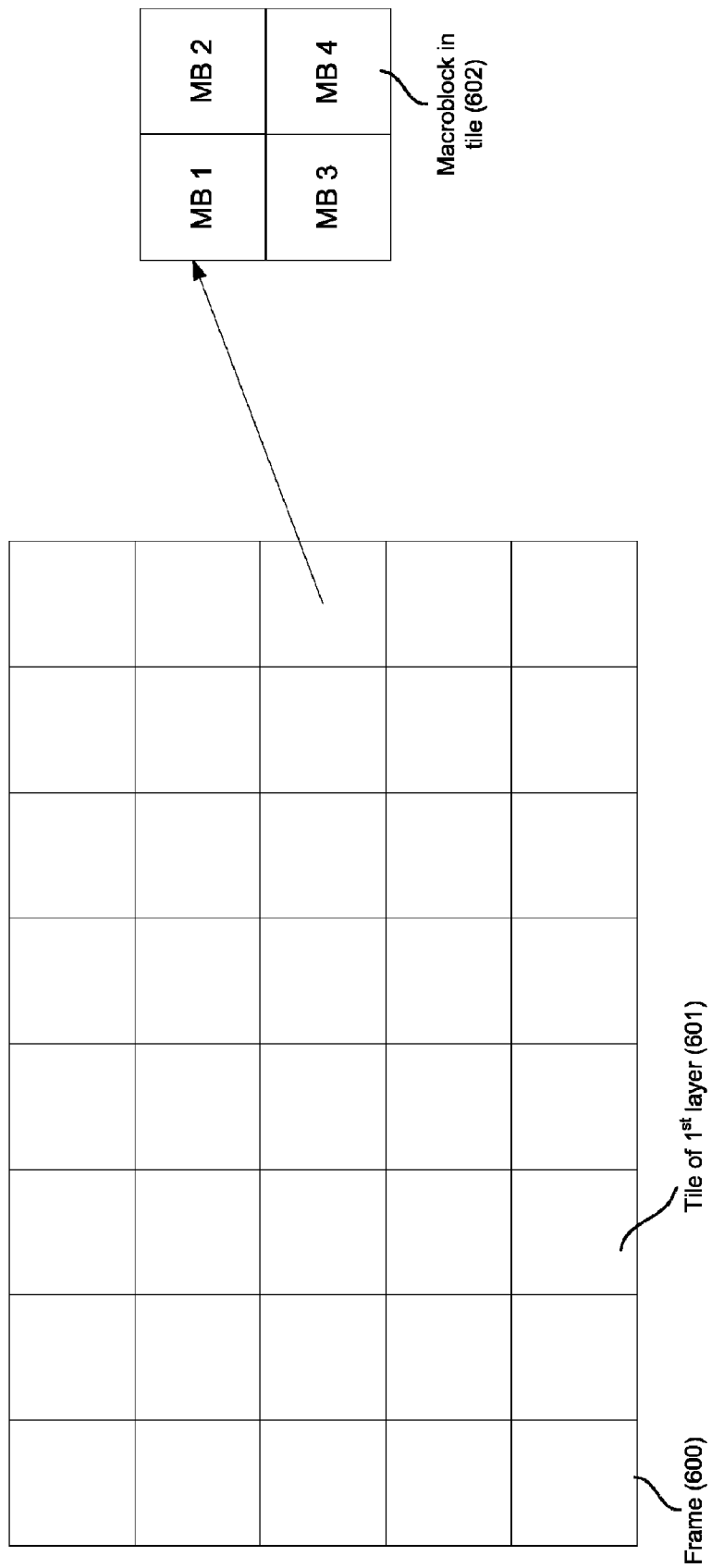
FIG. 6 shows the formation of $1^{st}$ layer of tiles of luminance components which comprises 4 macroblocks in raster scan order.

FIG. 6 to FIG. 10 show the hierarchical tiling format and its storage scheme in the external memory which suits the field/frame coding, variable block size data fetch and the data fetch by all the tools in the decoder. FIG. 6 shows that the luminance components of the frame 600 are divided into tiles 601 of 4 macroblocks in raster scan order 602 which form the $1^{st}$ layer of tiles. If the number of macroblocks in any direction is not divisible by 4, then an extra macroblock row or column has to be added in the required direction to get an integral number of tiles.

Figure 7:
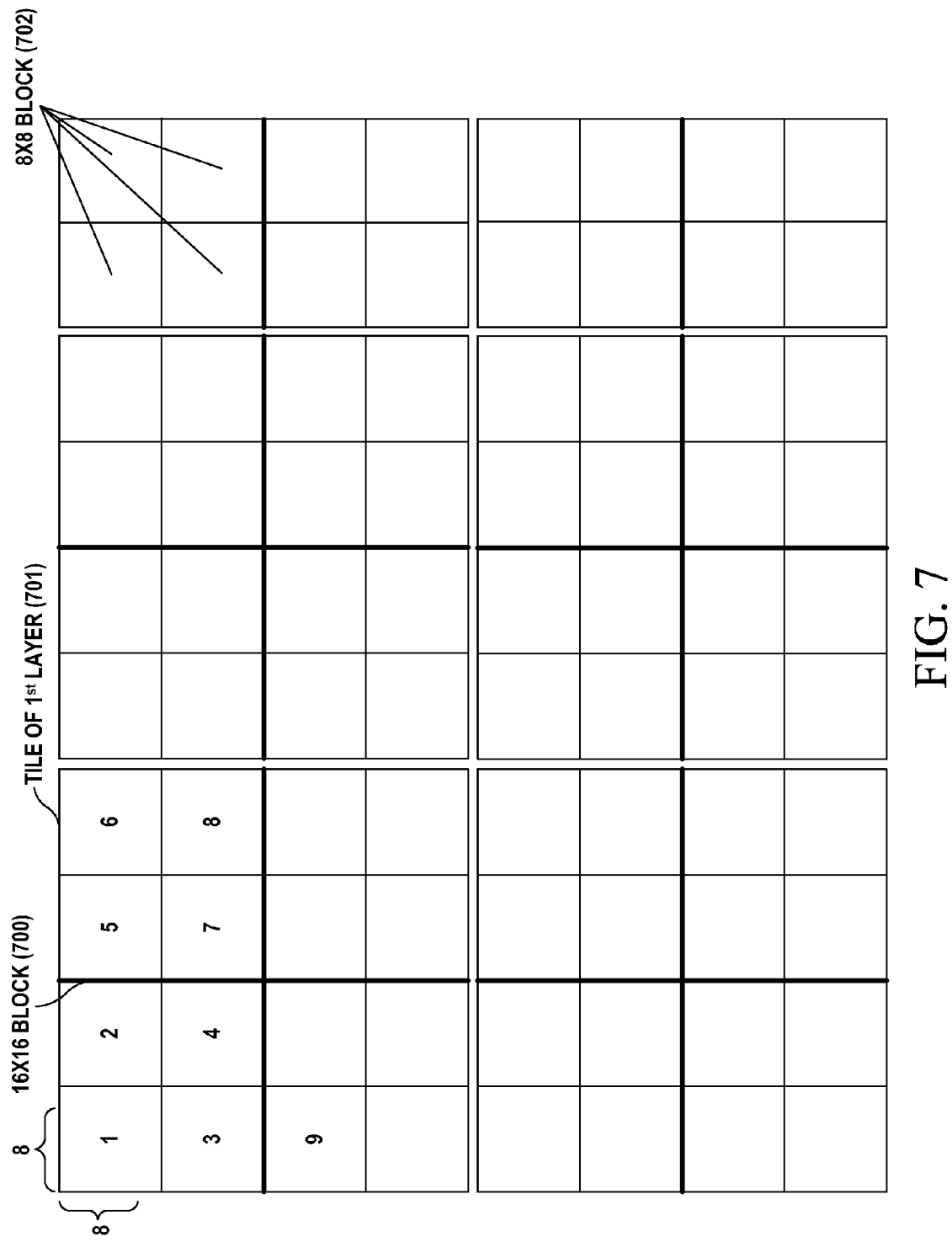
FIG. 7 illustrates the formation of a $2^{nd}$ layer of tiles of luminance components each of which has an 8×8 size.
Figure 8:
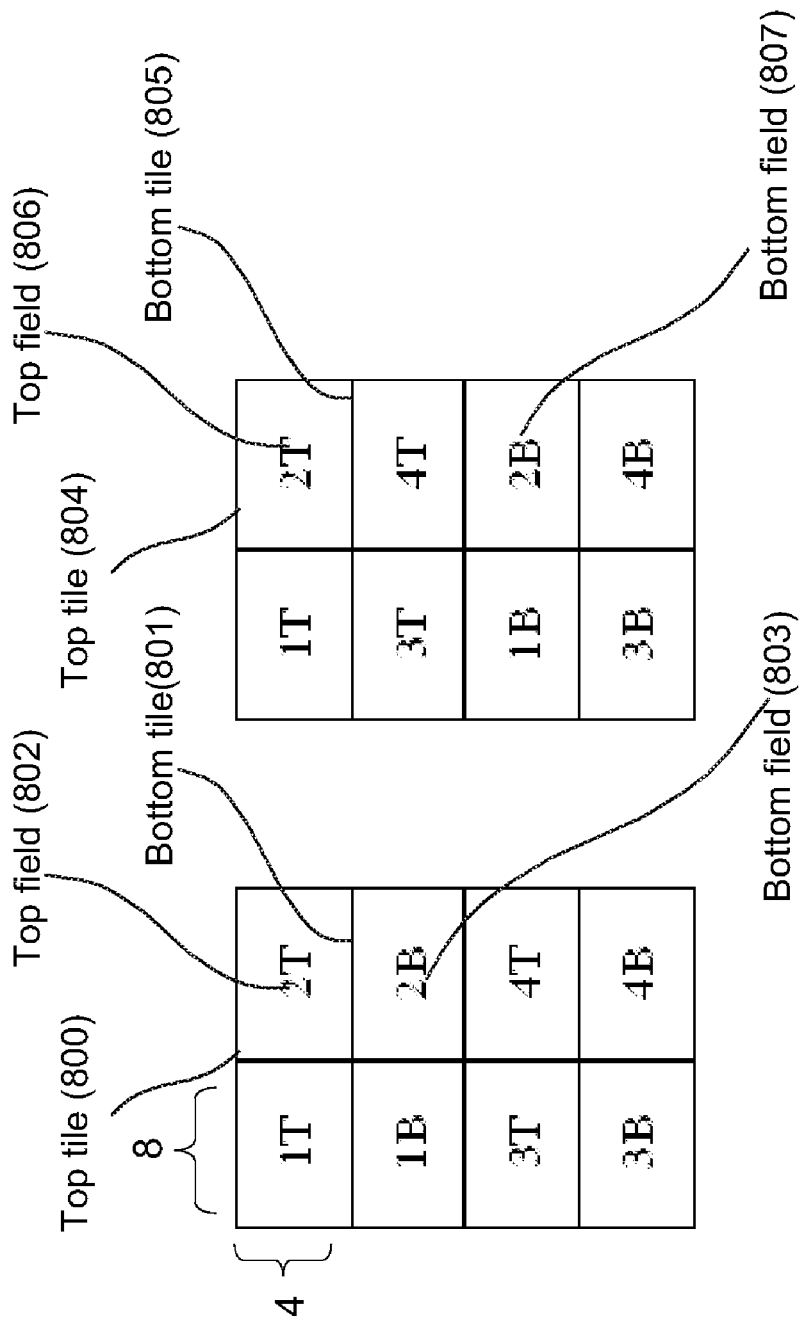
FIG. 8 shows the formation of a $3^{rd}$ layer of tiling of luminance components where each of the each 8×4 tiles stores the top or bottom fields of the 8×8 tile.

FIG. 7 shows how each luminance tile in the 1st layer is again divided into smaller blocks to get the 2nd luminance layer of tiling. Each of the first layer of tiles 701 which is of size 32×32 pixels, again divided into luminance tiles 700 of 16×16 size which form the 2nd layer. Further, the second layer is again divided to form the third layer of tiles. FIG. 8 illustrates how each the $3^{rd}$ layer tile is divided to form the fourth layer of tiles. Again each of the second layer tiles 700 is divided into four tiles of 8×8 size 702 to form the third layer of tiles. The 8×8 luminance tile contains both the top 802 and 806 and the bottom fields 803 and 807. The 8×8 tile is again divided into two 8×4 sub-blocks where the top 8×4 contains the top fields and the bottom 8×4 block contains bottom fields. This 8×4 forms the lowest layer of tiles.

FIG. 8 illustrates formation of the fourth layer of tiles of luminance components. The fields corresponding to each macroblock can be stored in either of the ways shown in FIG. 8 where, in the 1st diagram, each 8×8 luminance tile contains its own top field (802) and bottom field (803) in its top 8×4 tile (800) and bottom 8×4 tiles (801). In $2^{nd}$ diagram of FIG. 8, each 8×8 luminance tile contains its own top field (806) and the top field (4T) of the bottom 8×8 tile in its top 8×4 tile (804) and bottom 8×4 tiles (805).

Figure 9:
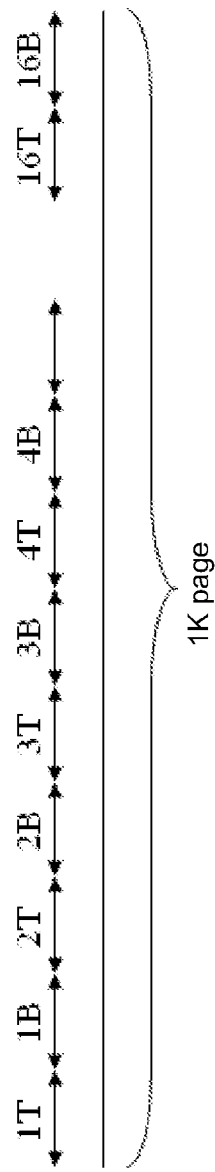
FIG. 9 shows how the data of each tile of luminance components of the $1^{st}$ layer is stored in the physical memory.
Figure 10:
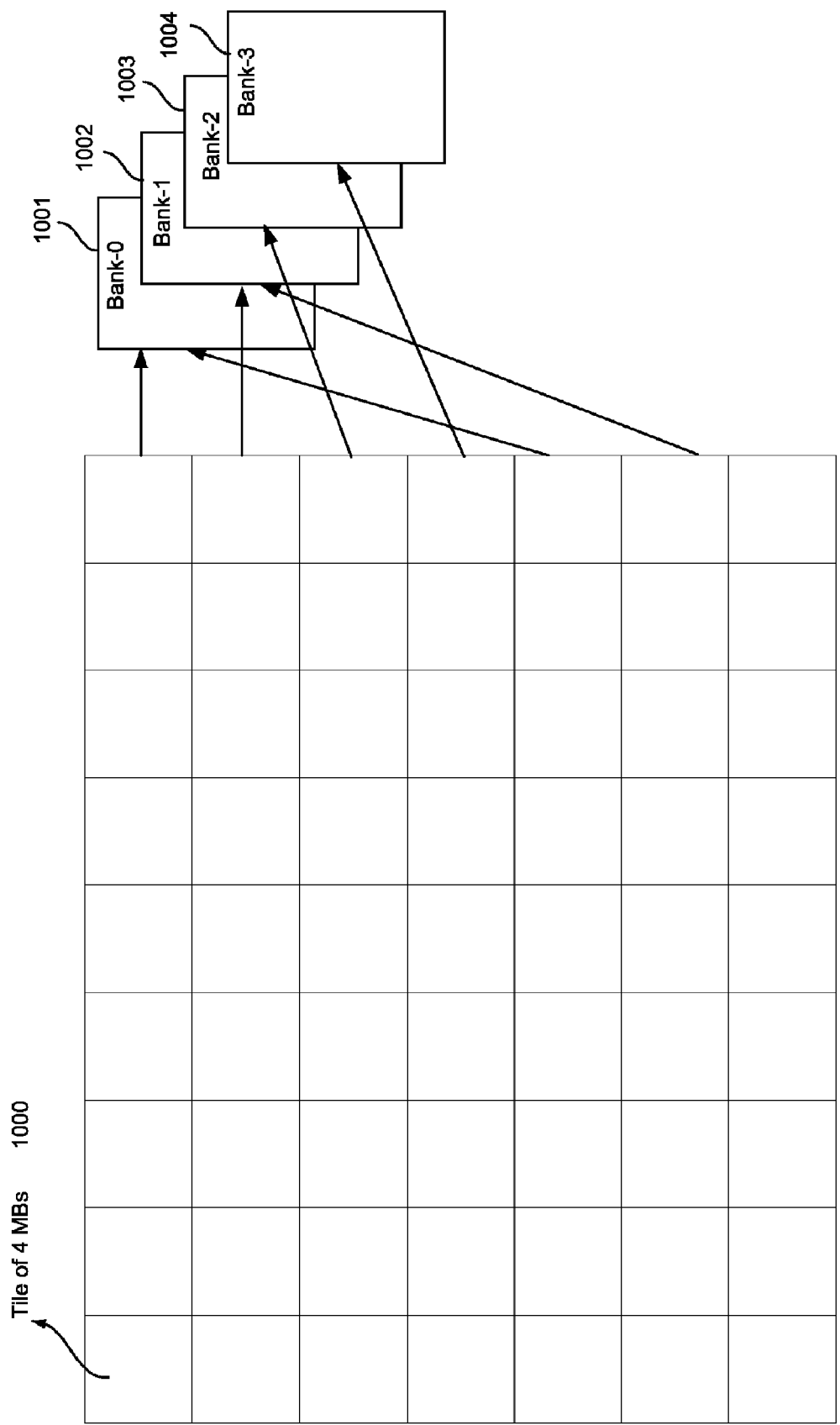
FIG. 10 shows how the tiles are distributed across different banks.

The size of each luminance tile in the $1^{st}$ layer is 1 KB assuming the size of a pixel is 1-byte. The embodiment as shown preferably uses a minimum effective page size of the external memory as 1 KB which fits one tile of top layer. Allocating a 1K page for a luminance tile, each 8×4 tile will be stored in contiguous memory locations in its raster scan order as shown in FIG. 9. If the effective page size is n*1K size then fit "n" continuous luminance tiles in a single page. FIG. 10 shows the arrangement of luminance tile rows in the banks. The complete tile row is stored in a single bank. The diagram assumes 4 banks in the memory, whereby the $1^{st}$ tile row is stored in bank-0, $2^{nd}$ tile row in bank-1 and so on. After storing the $4^{th}$ row in bank-3, the $5^{th}$ row again is stored in bank-0, and the process is repeated.

It is noted that in the standard H.264, the minimum luminance block to be fetched is 9×9 and the maximum is 21×21 for interpolation. If the block of interest falls anywhere inside the $1^{st}$ layer luminance tile, the complete data can be fetched continuously as the whole luminance tile is in a single page. As the depth of the $1^{st}$ layer luminance tile is 32 pixels, any block to be fetched can have a maximum span across 2 vertical tiles, which means that a maximum change of 2 banks is required. In the horizontal direction if the block spans across two $1^{st}$ layer luminance tiles, there is a possibility of row change latency. But if the effective page size is enough to accommodate more than one tile, then even if the block spans across tile boundaries, both the tiles will be in a single page and the page cross over latency will be avoided. The greater the number of tiles that fit in a single page, the greater is the probability of getting the block in a single page.

Figure 11:
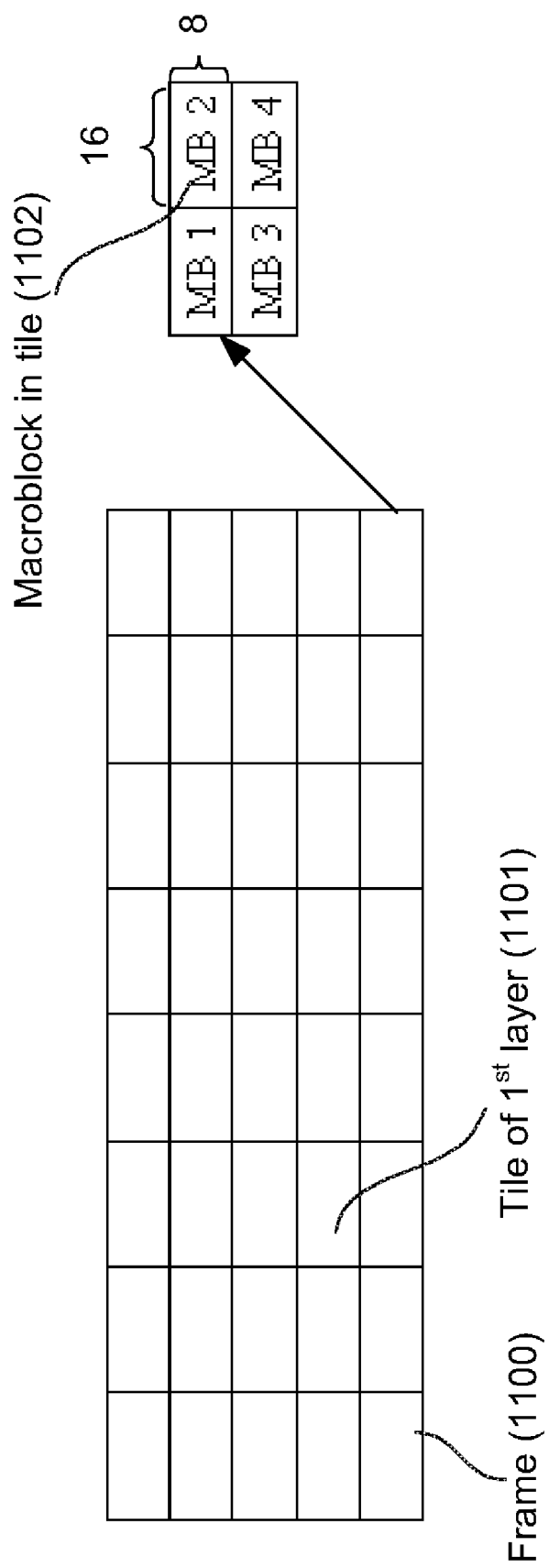
FIG. 11 shows how the 1st layer of tiles of the chrominance component in the frame is formed.

With reference to FIG. 11, the hierarchical tiling format gives importance to the chrominance components also. The $C_b$ and the $C_r$ components of each macroblock are packed together and hence the size for chrominance component of the macroblock is 16×8 size (1102). Like the luminance components, the chrominance components are also tiled hierarchically. As shown in FIG. 11, the chrominance components of the frame (1100) are divided into tiles (1101) of 4 macroblocks in raster scan order (1102) which form the $1^{st}$ layer of tiles. If the number of macroblocks in any direction is not divisible by 4, then an extra macroblock row or column has to be added in the required direction to get an integral number of tiles.

Figure 12:
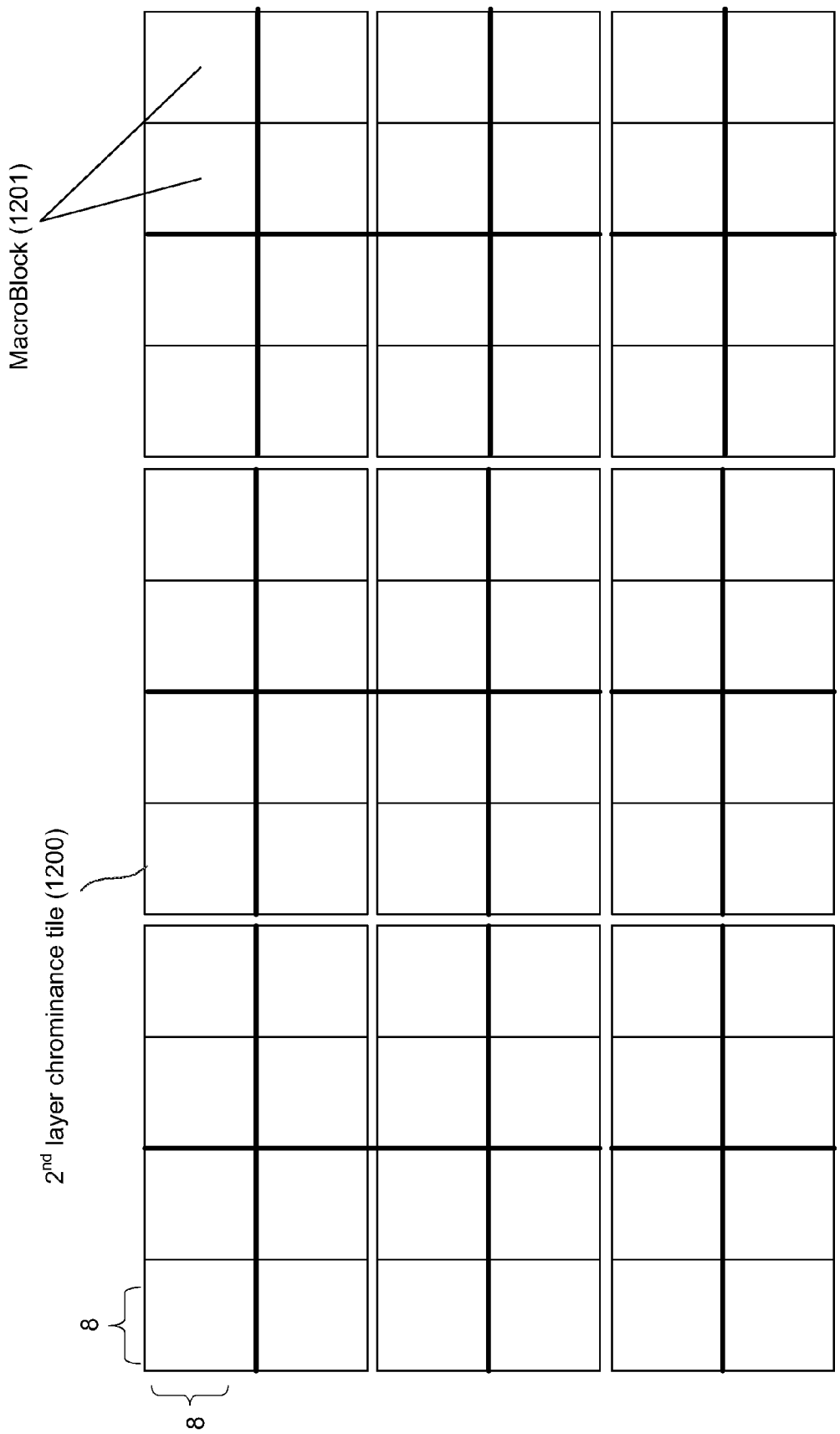
FIG. 12 shows the formation of a $2^{nd}$ layer of tiles of chrominance components which are each of 8×8 size.

FIG. 12 shows how each chrominance tile in the $1^{st}$ layer is again divided into smaller blocks to get the $2^{nd}$ chrominance layer of tiling. Each tile which is of size 32×16 pixels is again divided into eight chrominance tiles 1201 of 8×8 size which form the $2^{nd}$ layer. Each 8×8 chrominance tile contains both the top and the bottom fields. The 8×8 tile block is again divided into two 8×4 sub-blocks where the top 8×4 contains the top fields and the bottom 8×4 block contains bottom fields. This 8×4 forms the lowest layer of tiles. The storage of fields in the tile is the same as in the luminance case.

Figure 13:
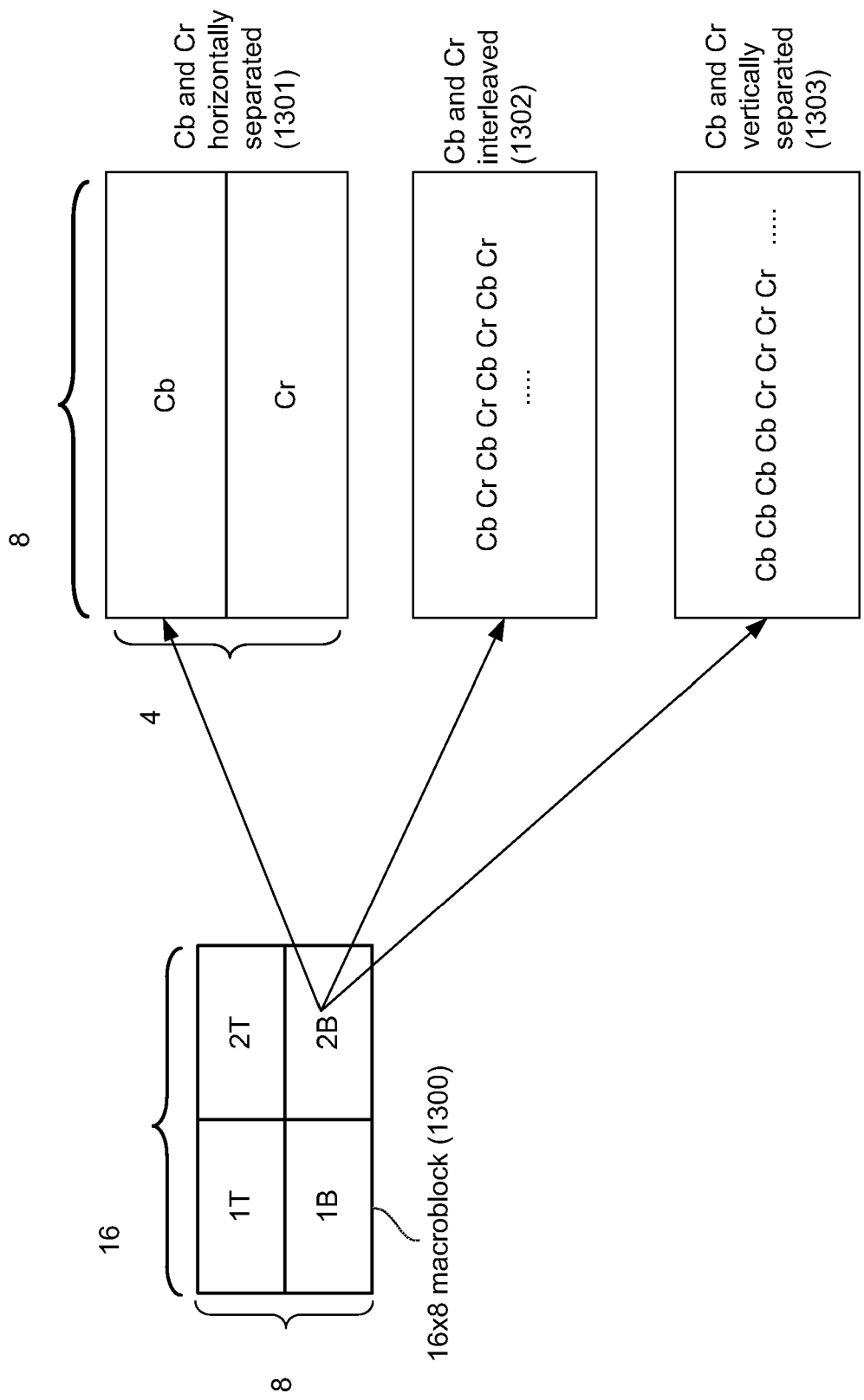
FIG. 13 shows the formation of a $3^{rd}$ layer of tiling of chrominance components where each 8×4 tile stores the top or bottom fields of the 8×8 tile, and also shows the arrangement of $C_b$ and $C_r$ components in the 8×4 tile; and, FIG. 14 shows a general purpose computing platform which can be used in implementing the invention.

The arrangement of the $C_b$ and the $C_r$ components can be any of the three cases shown in FIG. 13. In 1301, the 8×4 block is logically divided into two 8×2 halves and the one portion stores $C_b$ and the other stores the $C_r$ components. In the style shown in 1302, the $C_b$ and the $C_r$ components are interleaved together. The 8×4 block is divided into two 4×4 logical parts in 1303 where one side stores $C_b$ and other side stores $C_r$ components. In any of the above mentioned styles or cases, the complete 8×4 block has to be fetched in one burst and the internal circuitry will separate out the $C_b$ and the $C_r$ components.

In the kind of hierarchical tiling described hereinabove, the smallest luminance/chrominance block can be fetched in one burst. If a 32-bit DDR/DDR2 memory is used, then an 8×4 block (32 bytes) needs a fixed burst size of 8, and a 64-bit DDR/DDR2 memory needs a burst size of 4.

Figure 14:
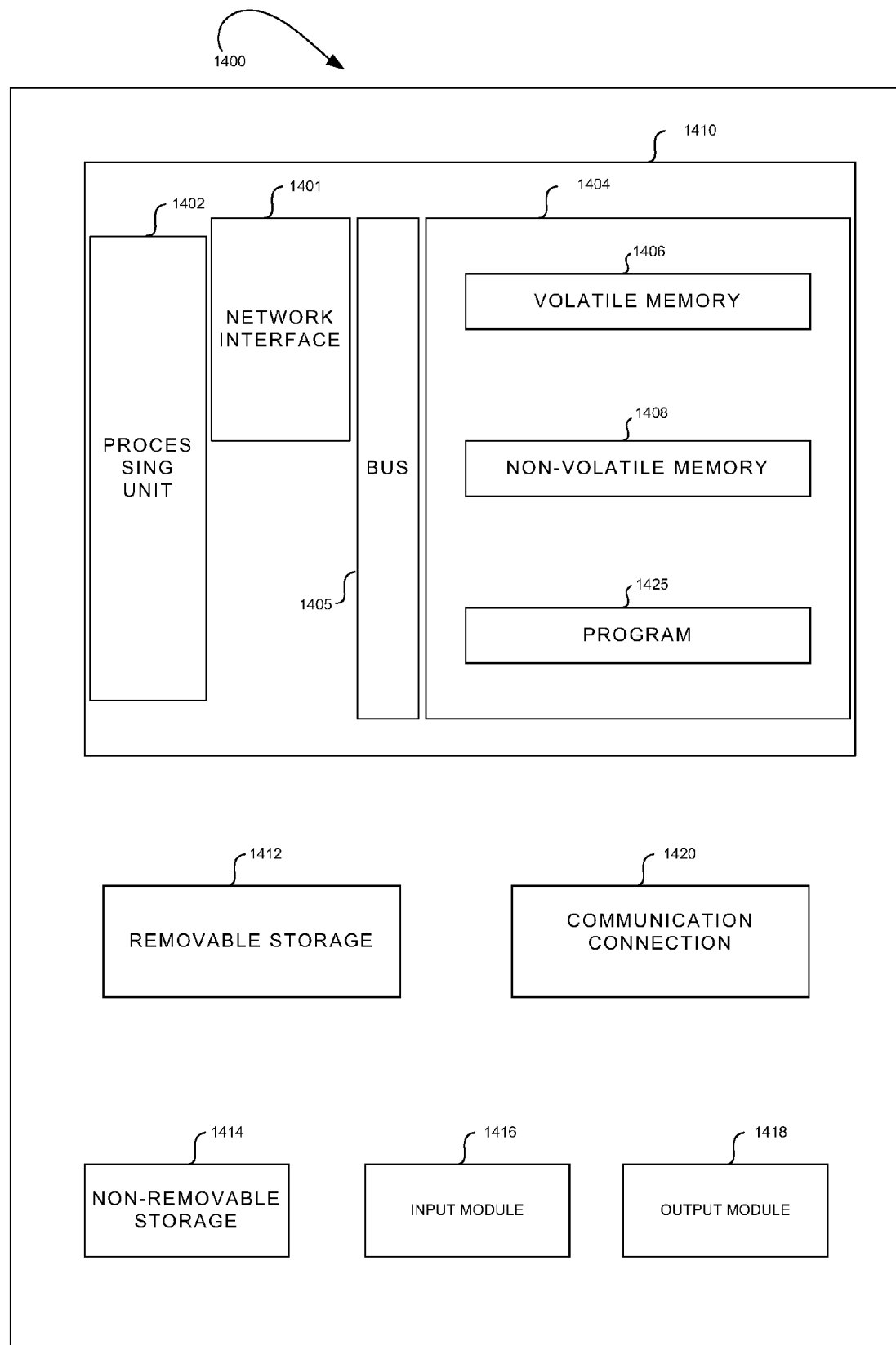

Various embodiments of the present subject matter can be implemented in software, which may be run in the environment shown in FIG. 14 or in any other suitable computing environment. The embodiments of the present subject matter are operable in a number of general-purpose or special-purpose computing environments. Some computing environments include personal computers, general-purpose computers, server computers, hand-held devices (including, but not limited to, telephones and personal digital assistants (PDAs) of all types), laptop devices, multi-processors, microprocessors, set-top boxes, programmable consumer electronics, network computers, minicomputers, mainframe computers, distributed computing environments and the like to execute code stored on a computer-readable medium. It is also noted that the embodiments of the present subject matter may be implemented in part or in whole as machine-executable instructions, such as program modules that are executed by a computer. Generally, program modules include routines, programs, objects, components, data structures, and the like to perform particular tasks or to implement particular abstract data types. In a distributed computing environment, the program modules may be located in local or remote storage devices.

FIG. 14 shows an example of a suitable computing system environment for implementing embodiments of the present subject matter. FIG. 14 and the following discussion are intended to provide a brief, general description of a suitable computing environment in which certain embodiments of the inventive concepts contained herein may be practiced.

A general purpose computing device in the form of a computer 1410 may include a processing unit 1402, memory 1404, removable storage 1412, and non-removable storage 1414. Computer 1410 additionally includes a bus 1405 and a network interface (NI) 1401. Computer 1410 may include or have access to a computing environment that includes one or more user input devices 1416, one or more output modules or devices 1418, and one or more communication connections 1420 such as a network interface card or a USB connection. One or more user input devices 1416 can be a touch screen and a stylus or the like. The one or more output devices 1418 can be a display device of computer, computer monitor, TV screen, plasma display, LCD display, display on a touch screen, display on an electronic tablet, or the like. The computer 1410 may operate in a networked environment using the communication connection 1420 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 1404 may include volatile memory 1406 and non-volatile memory 308. A variety of computer-readable media may be stored in and accessed from the memory elements of computer 1410, such as volatile memory 1406 and non-volatile memory 1408, removable storage 1412 and non-removable storage 1414. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like, chemical storage, biological storage, and other types of data storage.

"Processor" or "processing unit" as used herein, means any type of computational circuit, such as, but not limited to a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processing unit 1402 of the computer 1410. For example, a computer program 1425 may include machine-readable instructions capable of implementing a novel method of hierarchical tiling of data in the external memory for efficient data access, especially in high performance video applications according to the teachings of the described embodiments of the present subject matter. In one embodiment, the computer program 1425 may be included on a CD-ROM and loaded from the CD-ROM to a hard drive in non-volatile memory 1408. The machine-readable instructions cause the computer 1410 to decode according to the various embodiments of the present subject matter.

The foregoing is the description of exemplary implementations of a method and system for efficient fetching of data in high performance video applications using reference frames and a memory such as a DDR. The above-described implementation is intended to be applicable, without limitation, to situations where variable size data transfer and use of interlaced and progressive data fetch would provide an advantage. The description hereinabove is intended to be illustrative, and not restrictive.

The various embodiments of the model described herein are applicable generally to any system involving variable rate data fetching, and are specifically applicable in HDTV applications. The embodiments described herein are in no way intended to limit the applicability of the invention. Many other embodiments will be apparent to those skilled in the art. The scope of this invention should therefore be determined by the appended claims as supported by the text and the drawing, along with the full scope of equivalents to which such claims are entitled.

The invention claimed is:

1. A method for storing a video frame in an external memory for efficient data access in high performance video applications, wherein the video frame includes macroblocks, comprising:
   offsetting the video frame by a predetermined value with respect to the macroblock boundary;
   partitioning the offsetted video frame into a first set of tiles in such a manner that each tile in the first set of tiles fully fits in one page of the external memory, wherein each tile includes one or more offsetted macroblocks;
   further partitioning each tile in the partitioned first set of tiles recursively into further sets of smaller tiles, until the size of each tile in the further sets of smaller tiles is same as burst size of the external memory; and
   storing the further sets of smaller tiles associated with each tile in the partitioned first set of tiles in one page of the external memory in a raster scan order upon the size of each of the further sets of smaller tiles is same as the burst size of the external memory.

2. The method as in claim 1, wherein the external memory comprises a DRAM (Dynamic Random Access Memory).

3. The method as in claim 1, wherein the external memory comprises a DRAM, and wherein the first set of tiles constitutes a top layer of tiles, and, wherein said further sets of smaller tiles comprise a lower layer of tiles arranged in a manner to facilitate fetching of variable block sized data at a fixed burst.

4. The method as in claim 3, including arranging each of a smaller set of tiles in an interlaced frame into two vertically adjacent top and bottom sets of tiles where the top set of tiles will contain a top field and the bottom set of tiles will contain a bottom field.

5. The method as in claim 3, including arranging each of a smaller set of tiles in an interlaced frame into two vertically adjacent top and bottom sets of tiles where the top set of tiles will contain a bottom field and the bottom set of tiles will contain a top field.

6. The method of claim 3 applied to progressive data including arranging alternate field lines, where the alternate field lines are selectively separated into two adjacent smallest sets of tiles, or arranged as alternate lines in the same tile.

7. The method as in claim 3, including arranging a lowest layer of tiles to have components selected from a group consisting of intensity components (Y) and color space components (Cb and Cr), with a provision that the intensity components and color space components can be separated such that each tile containing color space components contains an equal number of color space components.

8. The method as in claim 7, including arranging a lower chrominance tile in such a manner that each color space component Cb is followed by a corresponding Cr component.

9. The method of claim 7, including arranging a lowest chrominance tile in such a manner that each row in the tile should have half Cb components together, followed by half Cr components.

10. The method as in claim 7, including arranging a lowest chrominance tile in such a manner that the tile is divided horizontally into first and second equal halves, the first half containing Cb components, the second half containing Cr components.

11. The method as in claim 3, wherein if an effective page size is 'N' times the size of a tile in said first set of tiles, the method including placing 'N' of said first set of tiles in raster scan order in a frame in the same page.

12. The method as in claim 3, further comprising:
distributing vertically adjacent first set of tile rows into different banks.

13. An article comprising a non-transitory computer-readable storage medium having instructions thereon, which when executed by a computer, causes the computer to perform a method as recited in claim 1.

14. A method of storing a video frame in a DRAM for an HDTV application using data-fetch that requires a high external memory bandwidth, wherein the video frame includes macroblocks, comprising the steps of:
offsetting the video frame by a predetermined value with respect to the macroblock boundary;
partitioning the offsetted video frame into a first set of tiles in such a manner that each tile in the first set of tiles fully fits in one page of the DRAM, wherein each tile includes one or more offsetted macroblocks;
further partitioning each tile in the partitioned first set of tiles recursively into further sets of smaller tiles, until the size of each tile in the further sets of smaller tiles is same as burst size of the DRAM; and
storing the further sets of smaller tiles associated with each tile in the partitioned first set of tiles in one page of the DRAM in a raster scan order upon the size of each of the further sets of smaller tiles is same as the burst size of the DRAM.

15. A method for a high performance video application where a part of a video frame accessed as one or more two-dimensional tiles and a DRAM memory is used, the method implementing storing the video frame in the DRAM memory, wherein the video frame includes macroblocks, comprising the steps of:
offsetting the video frame by a predetermined value with respect to the macroblock boundary;
dividing the offsetted video frame into a first set of tiles in such a manner that each tile in the first set of tiles fully fits in one page of the DRAM memory, wherein each tile includes one or more offsetted macroblocks;
further partitioning each tile in the divided first set of tiles recursively into further sets of smaller tiles, until the size of each tile in the further sets of smaller tiles is same as the burst size of the DRAM memory; and
storing the further sets of smaller tiles associated with each tile in the divided first set of tiles in one page of the DRAM memory in a raster scan order upon the size of each of the further sets of smaller tiles is same as the burst size of the DRAM memory.

16. An article comprising a non-transitory computer-readable storage medium having instructions thereon, which when executed by a computer, causes the computer to perform a method as recited in claim 15.

* * * * *